United States Patent [19]
Herklotz

[11] Patent Number: 5,511,933
[45] Date of Patent: Apr. 30, 1996

[54] SHUTTLE TRANSFER WITH LINEAR TRANSDUCER FEEDBACK

[75] Inventor: Jack F. Herklotz, Traverse City, Mich.

[73] Assignee: Trantek, Incorporated, Traverse City, Mich.

[21] Appl. No.: 444,857

[22] Filed: May 19, 1995

Related U.S. Application Data

[63] Continuation of Ser. No. 2,166, Jan. 8, 1993, abandoned.

[51] Int. Cl.⁶ ........................................ B25J 9/16
[52] U.S. Cl. .................. 414/749; 901/9; 901/16; 901/23; 901/47
[58] Field of Search .................... 414/749, 751, 414/752, 753; 901/9, 16, 23, 46, 47; 74/89.14; 324/207.18; 318/657–660

[56] References Cited

U.S. PATENT DOCUMENTS

| | | | |
|---|---|---|---|
| 3,819,902 | 6/1974 | Sidbeck et al. | 901/16 X |
| 3,884,363 | 5/1975 | Ajlouny | 901/16 X |
| 4,205,217 | 5/1980 | Araya | 901/46X |
| 4,319,864 | 3/1982 | Kaufeldt | 414/751 X |
| 4,600,358 | 7/1986 | Graf . | |
| 4,836,111 | 6/1989 | Kaufmann . | |
| 4,843,708 | 7/1989 | Yokoi et al. . | |
| 4,907,169 | 3/1990 | Lovoi | 901/47 X |
| 5,180,979 | 1/1993 | Frazzini et al. | 324/207.18 |

Primary Examiner—Donald W. Underwood
Attorney, Agent, or Firm—Howard & Howard

[57] ABSTRACT

A shuttle transfer assembly (10) is able to accurately position a workarm (12) in two axes (X, Y) to a selected coordinate position. The assembly (10) include two position controllers (74, 76) each operating along a single axis for positioning the workarm (12) to the coordinate position. A central controller (86) functions to control the sequencing of the separate position controllers (74, 76). Coarse and fine sensors (62–68) are provided to allow feedback of position to the position controllers (74, 76). The coarse sensor (62, 64) operates for general positioning as an encoder on the servo drive motor. The fine sensors (66, 68) extend from the workarm (12) to produce the final, high resolution positioning.

17 Claims, 4 Drawing Sheets

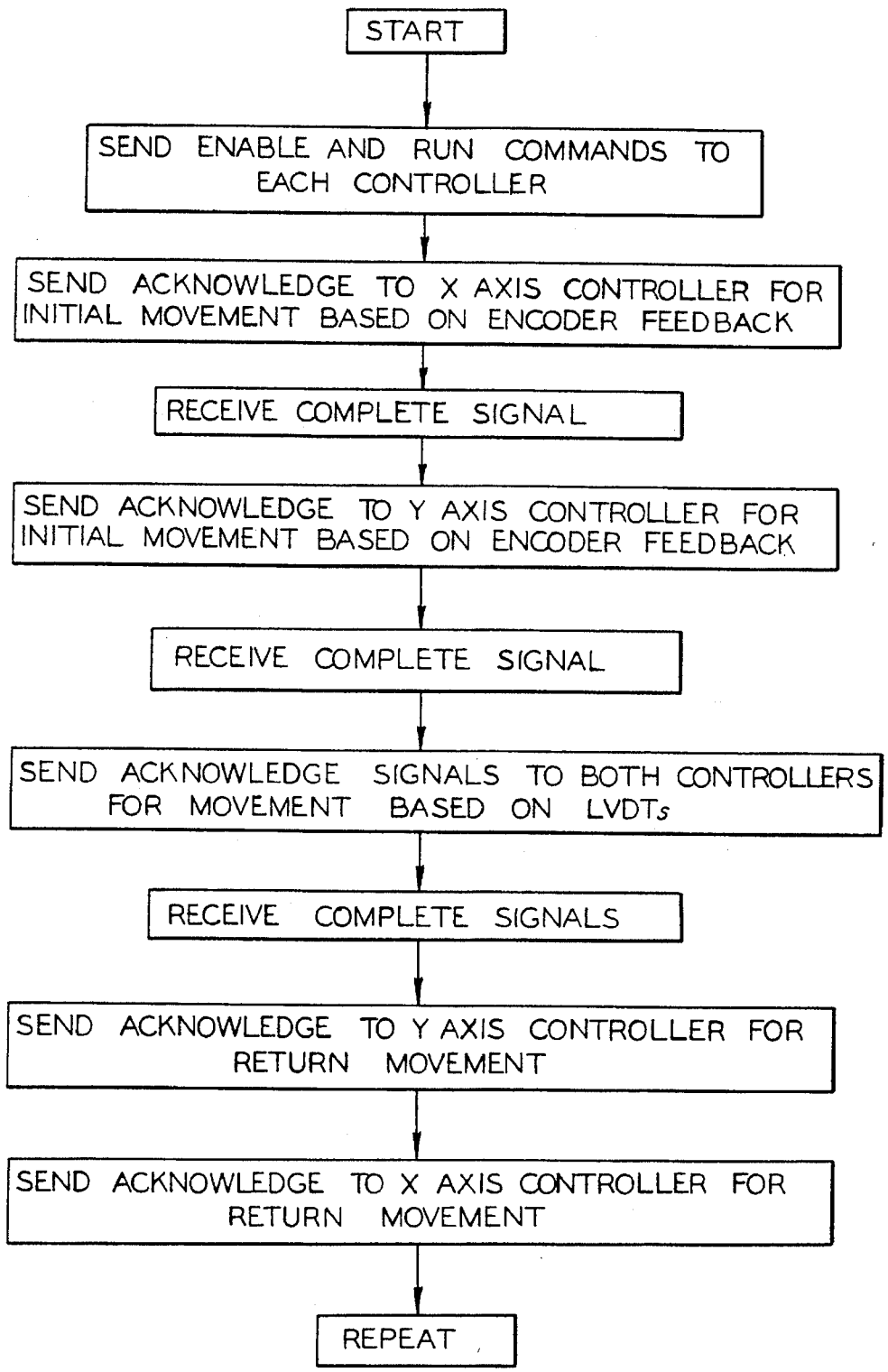

SHUTTLE TRANSFER WITH LINEAR TRANSDUCER FEEDBACK

This is a continuation of application Ser. No. 08/002,166 filed on Jan. 8, 1993 and now abandoned.

TECHNICAL FIELD

The invention relates to an apparatus and method for controlling the position of a carrier or shuttle assembly in at least one axis of the type utilizing threaded driving shafts which are rotated to cause linear movement of a carrier connected thereabout, which shuttle assembly may be utilized for loading and assembling processes with high accuracy.

BACKGROUND OF THE INVENTION

Shuttle transfer systems have been known in the art which are controlled to position a tool or assembly component in a specified position in one, two or three axes. Exemplary of such a system is U.S. Pat. No. 4,836,111, issued Jun. 6, 1989 in the name of Kaufmann wherein positioning is controlled by a rack and pinion drive. However, it has been determined that accuracy by a rack and pinion drive is minimal, and many applications require a higher accuracy.

U.S. Pat. No. 4,600,358, issued Jul. 15, 1986 in the name of Graf discloses a manipulating device operating in two axes wherein the drive is provided under computer control via a gear rack and pinion. A position sensing transducer with a pulse generator is provided on the control of the drive. This sensor is a prestressed sensor pinion engaging the corresponding gear track to provide position information. This type of sensor which is engaged on the driving track also can be inaccurate with respect to the positioning of the workarm or tool thereon.

U.S. Pat. No. 4,843,708, issued Jul. 4, 1989 in the name of Yokoi et al discloses an assembling system for assembling an automotive engine and transmission which are supported on lifter tables and are controllably moved to change the location thereof in response to positioning detectors comprising CCD cameras. However, there is no shuttle movement, and use of cameras can be expensive and complex.

SUMMARY OF THE INVENTION

The invention is a positioning transfer assembly for positioning a workarm in at least one axis. The assembly comprises first transfer means adapted to be connected to the workarm for moving the workarm along a first axis. Coarse sensor means is connected to the first transfer means for sensing the general position thereof and the general position of the workarm. Fine sensor means is attached to the workarm for sensing the position of the workarm along the first axis. Control means is connected to each of the first transfer means and sensor means for controlling the first transfer means to a first coordinate position based on the coarse sensor means at a predetermined high speeds, and for controlling the first transfer means to a second coordinate position based on the fine sensor means at a predetermined low speed less than the predetermined high speed.

The transfer assembly also includes second transfer means connected to and supporting the first transfer means for moving the workarm along a second axis. The course sensor is also connected to the second transfer means and the control means is connected thereto for controlling independently the first and second transfer means at the different speeds. The course sensor is a motor encoder and the fine sensor is a linear transducer.

FIGURES IN THE DRAWINGS

Other advantages of the present invention will be readily appreciated as the same becomes better understood by reference to the following detailed description when considered in connection with the accompanying drawings wherein:

FIG. 5 is a flow chart of the controls of the assembly.

DESCRIPTION OF THE PREFERRED EMBODIMENT

Figure 1:
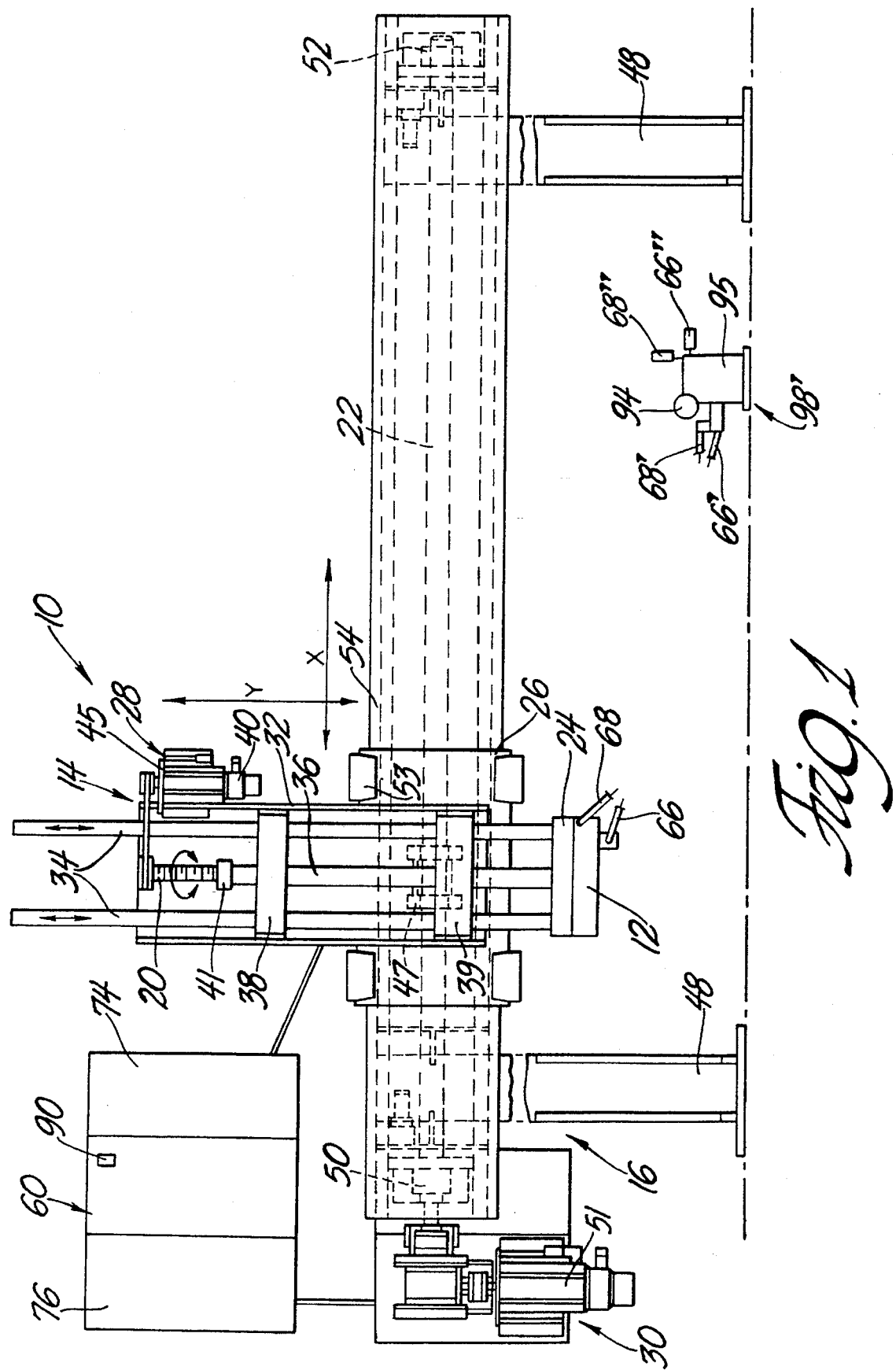
FIG. 1 is a front view of an illustrative embodiment of the subject invention.
Figure 2:
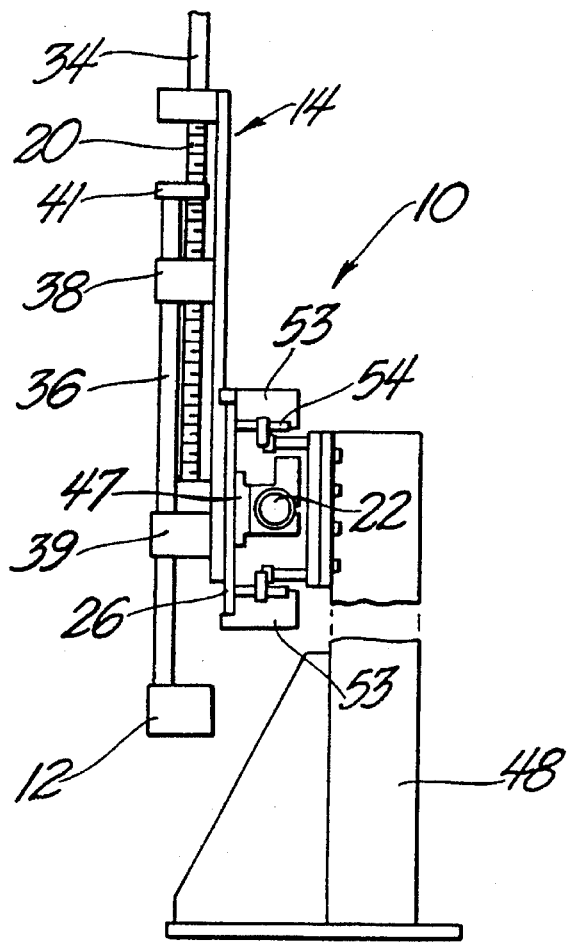
FIG. 2 is a side view taken along lines 2—2 of FIG. 1.

A positioning transfer assembly of the type for moving a workarm 12 to predetermined coordinates is generally illustrated at 10 in FIG. 1. The transfer assembly 10 is able to move the workarm 12 in two axes X, Y. The workarm 12 may carry an object to be assembled or located to a predetermined coordinate position or alternatively move a tool to operate in a predetermined coordinate position. The transfer assembly 10 is capable of positioning the workarm 12 with very high accuracy and resolution to positional coordinates to preform intricate work, such as assembling components within engines.

The assembly 10 includes first transfer means 14 adapted to be connected to the workarm 12 for moving the workarm 12 along a first axis Y. Second transfer means 16 is connected to and supports the first transfer means 14 for effectively positioning the workarm 12 along a second axis X. In the preferred embodiment, the axes X, Y are perpendicular to one another. It is to be understood that one or more axes may be utilized based on the teachings of the subject invention.

Each of the transfer means 14, 16 include a rotatable threaded drive shaft 20, 22 with a carrier member 24, 26 operatively connected and engaged therewith for linearly moving along the shaft 20, 22 in response to rotation of the threaded shaft 20, 22. Drive means 28, 30 is operatively connected to each of the threaded shafts 20, 22 to control the rotation thereof and therefore the linear movement of the carrier member 24, 26.

In the preferred embodiment, the carrier member 26 of the second transfer means 16 supports and is connected to the first transfer means 14 thereby allowing movement of the workarm 12 in the X and Y axes. In other words, the drive means 30 of the second transfer means 16 is operated to control the rotation of the threaded shaft 22 to move the carrier member 26 along axis X to predetermined positions. The first transfer means 14 is supported on the carrier member 26 of the second transfer means 16 and therefore also moves along axis X in response to the drive means 30. Additionally, the first transfer means 14 supported on the carrier member 26 can move along axis Y thereby moving the workarm 12 in a two coordinate plane.

In particular, the first transfer means 14 providing motion along axis Y is provided by a TranTek 21-inch stroke Electric Lifter 32 fixedly secured to and mounted on the carriage member 26. The lifter 32 employs two 1½ inch diameter Thompson guide rods 34 that are guided through four Simplicity Bearings supported in tie plates 38, 39 on the top and bottom, and is connected to the carrier member 24 on the bottom thereof. The screw shaft 20 comprises a 1³⁄₁₆ inch diameter, 1.2 inch lead screw and is supported at the tie plate 39 by a bronze bushing at the opposite end of the screw shaft 20 and by a Double Row ball bearing at the driving end of the screw shaft 20. A DriTran nut 41 is connected about and engaged within the threads of the shaft 20 and connected about the shaft 20, the interior surface of the nut 41 has threads mating with the threads of the shaft 20. The nut 41 is connected to a rod 36 which moves linearly in response to the rotation of the screw shaft 20 by the interaction between the nut 41 and the shaft 20. The rod 36 is also fixedly connected to the carrier member 24 comprising the workarm 12. The screw shaft 20 is driven by an Indramat MAC90C-0-GD4-C/110-A-1/W1520LX/S001 servo motor 45 through a belt/pulley with a 1:1 ratio. A drive amplifier 40 operates in conjunction with the motor 45, as commonly known in the art, and is of the type DSC 3.1-50-115V.

The second transfer means 16 is similar to the first transfer means 14. The second transfer means 16 includes a side mounted TranTek StarTran A4 shuttle which is supported by two columns 48 at the outboard ends of the shuttle housing. The shuttle 16 has a 9 foot stroke capability employing a 1⅞ inch diameter, 4 inch lead screw shaft 22 with a DriTran polymer nut 47 connected to the carrier 26 and is driven by Indramat servo motor 48 of the type utilized in the first transfer means 14, through a Cone Drive Reducer with a 5:1 reduction. A drive amplifier 49 operates in conjunction with and is connected to the servo motor 48, and is of the same type as in the first transfer means 14. The threaded shaft or screw 22 is supported by a Timken bearing assembly 50 at the drive end and a Fafnir ball bearing assembly 52 at the opposite end with both assemblies enclosed in a welded steel bearing housing. The carrier member 26 is guided by 1¾ inch diameter cam followers 53 riding on Sheffield rectangular rails 54.

The assembly 10 also includes coarse sensor means 62, 64 connected to the first and second transfer means 14, 16 for sensing the position of the workarm. Fine sensor means 66, 68 is attached to the workarm 12 for sensing the position of the workarm 12 along the first and second axes Y, X.

The assembly 10 includes control means 60 connected to each of the first and second transfer means 14, 16 for controlling movement thereof to predetermined coordinate positions. The control means 60 is connected to the drive means 28, 30 and the sensor means 62–68 for controlling same to control the movement. The control means 60 operates in conjunction with the sensor means 62–68 for controlling independently the drive means 28, 30 of the first and second transfer means 14, 16 to a first coordinate position at predetermined high speeds, based on the coarse sensor means 62, 64, and for simultaneously controlling the first and second transfer means 14, 16 to a second coordinate position at predetermined low speeds based on the fine sensor means 66, 68.

In the preferred embodiment, the coarse sensor means 62, 64 is connected to and a part of each servo motor 45, 48 and is generally comprised of an encoder providing positional feedback information. Therefore, the position is determined based on motor rotation and therefore rotation of the threaded shafts 20, 22, and resultant linear movement of the carrier members 24, 26. The fine sensor means 66, 68 is preferably a linear variable differential transducer (LVDT) of the type Heidenhain number MT-25W. Each of the LVDTs 66, 68 feed their position signals to a signal conditioner 70, 72 of the type Heidenhain number EXE 602 D/1/F and to the control means 60.

The control means 60 includes first and second positioning means 74, 76 for receiving information from the LVDT 66, 68 and the encoders 63, 65 to control the motors 45, 48 to ensure proper positioning of the carrier members 24, 26 and ultimately the workarm 12. In the preferred embodiment, the positioning means 74, 76 are each an Indramat Trans 01.7 controlled with version TR25 008.1 software. Each of the position controllers 74, 76 operate independently of one another and in response to their sensor input signals. The positioning controllers 74, 76 include memories 80, 82 for storing program control information and parameters which controls the positioning based on either the encoders 62–64 or the LVDTs 62, 64. The drive amplifier 40, 49 receives positioning signals from the positioning controllers 74, 76 and feedback signals form the encoders 62, 64 to control the motors 45, 48 for positioning to the predetermined programmed positions. The LVDTs 66, 68 are directly connected through the conditioner 70, 72 to the positioning controllers 74, 76 to feed back exact position signals, wherein the position controllers 74, 76 send control signals to the drive amplifier 40, 49 without encoder control until the predetermined position is reached.

The control means 60 also includes central controller means 86 which comprises a PLC controller of the type Allen Bradley 5/25. The central controller 86 receives and provides signals to both of the positioning controllers 74, 76 and has ultimate control on which positioning controller 74, 76 will operate and the sequence thereof. The central controller 86 may have each of the positioning means 74, 76 operating at the same time, or sequentially as desired. Control cables 88 are connected between the central controller 86 and the positioning controllers 74, 76. The cable 88 communicates program enable and acknowledge signals from the central controller 86 to selected positioning controllers 74, 76 which allow enablement and operation of their programs. The cable 88 also communicates complete signals from the positioning controllers 74, 76 to the central controller 86 indicating completion of a step and awaiting further enablement via an acknowledge signal.

Figure 4:
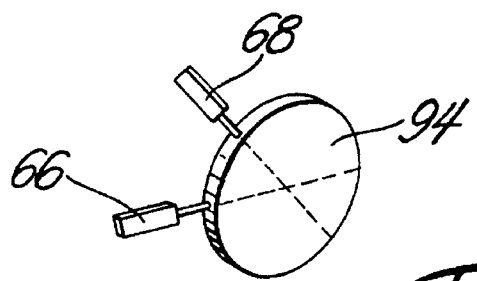
FIG. 4 is a perspective view of the fine sensors and positioning thereof for the subject invention.
Figure 3:
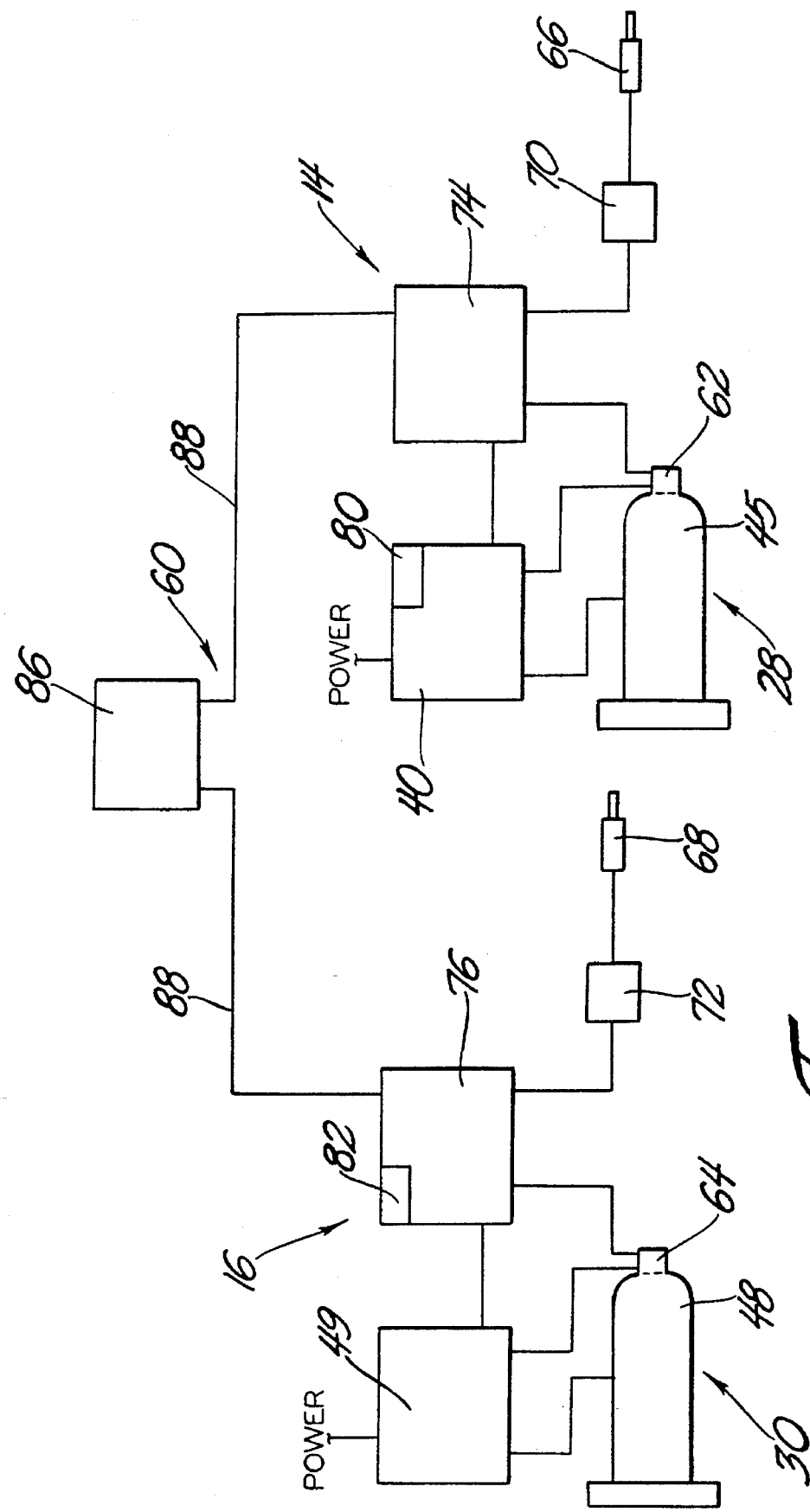
FIG. 3 is a schematic diagram of the position controls of the subject invention.

As best illustrated in FIG. 4, both of the LVDTs 66, 68, one for each axis X, Y, are mounted on the Y axis. A cylindrical locating surface 94 was provided to enable the LVDT 66, 68 an intersection point on which to locate. The locating surface can also be flat plates or anything that gives an intersection of the LVDT center lines. The placement of the LVDTs 66, 68 can be either on the device to move or at a location of the end point of the move.

In general, the central controller 86 will instruct the second position controller 76 to move to a first position along the X axis at a high speed, then instruct the first positioning controller 74 to move to a first position along the Y axis also at high speed. Then the central controller 86 instructs simultaneously the first and second positioning controllers 74, 75 to move to a second position at a slow speed, the positioning based on the feedback from the LVDTs 66, 68.

The flow chart of the controllers 86, 74, 76 will be dependent upon the movement desired. A typical exemplary flow chart in FIG. 5 illustrates the process of controlling the workarm 12 to thread a needle. Positional accuracy may be acquired below±0.0005 inch. In this example, the eye of the needle had a width of 0.016 inch with a thread of wire that was 0.015 inch in diameter. In this case, the first transfer means 14 operates in a horizontal axis X and the second transfer means 16 operates in a vertical axis Y.

In order to accomplish the program of threading a needle, the following exemplary parameters where programmed into the position controllers 74, 76. Number Parameter Value Axes X Valve Axes Y:

| NO. | PARAMETER | X AXIS VALUE | Y AXIS VALUE |
|---|---|---|---|
| P02 | Serial Cycle Inputs | 0000 | 0000 |
| P03 | Serial Ackn-Inputs | 00000000 | 00000000 |
| P04 | Serial Condition | 0 | 0 |
| P05 | Units | 0 = MM | 0 = MM |
| P06 | Encoder Cycles/Rev | 1250 | 1250 |
| P07 | Ballscrew Lead | 101.6000 MM | 30.4800 MM |
| P08 | Gearbox Rev In | 5 | 1 |
| P09 | Gearbox Rev Out | 1 | 1 |
| P10 | + Travel Limit | 2100 MM | 2000 MM |
| P11 | − Travel Limit | −0.001 MM | −5000 MM |
| P12 | Reference Position | 0.000 MM | 0.000 MM |
| P13 | Motor RPM/10 Volts | 3000 MM/Min | 3000 MM/Min |
| P14 | KV Factor | 1 | 1 |
| P15 | Homing Speed | 6000 MM/Min | 3000 MM/Min |
| P16 | Rapid Speed | 60000 MM/Min | 91440 MM/Min |
| P17 | Jogging Speed | 1000 MM/Min | 1000 MM/Min |
| P18 | Jogging Rapid | 20000 MM/Min | 65000 MM/Min |
| P19 | Ramp | 750 MM/S2 | 10 MM/S2 |
| P20 | Max Feed Rate | 1 MM/Min | 30000 MM/Min |
| P21 | Retract | 0.000 MM | 0.000 MM |
| P22 | Direction Polarity | 1 | 0 |
| P23 | Homing Direction | 1 | 1 |
| P24 | Jogging Direction | 0 | 0 |
| P25 | Max FeedRate for G5 | 250 MM/Min | 250 MM/Min |
| P32 | Lin-Enc-Resolution | 0.0100 MM | 0.0100 MM |
| P33 | Ack Inp Used | 11111111 | 11111111 |
| P34 | Max-Lin-Enc-Defl | 100.000 MM | 100.000 MM |
| P35 | Lin-Encoder PreLimit | 90.000 MM | 90.000 MM |
| P37 | Spindle Direction | 1 | 1 |
| P38 | Spindle RPM/10 Volts | 2000 | 2000 |
| P39 | Maximum Correction | 32.767 MM | 32.767 MM |

Each of the position controllers 74, 76 also included programming of and use of the parameters as follows.

For the X axis, the following program was used:
(a) Block 000: move to position 2068 based on the encoder, rapid speed, provide complete signal to PLC.
(b) Block 001: move to position 2070 based on the encoder, feed rate equals 10000, send complete signal to PLC.
(c) Block 002: move to position 3.5 based on the LVDT, feed rate equals 50, send complete signal to PLC.
(d) Block 003: move to position 8.5 based on LVDT, feed rate equals 50, go to next line.
(e) Block 004: move to 3.5 based on LVDT, feed rate equals 50, go to next line.
(f) Block 005: move to position 0 based on encoder, rapid speed, send complete signal to PLC.
(g) Block 006, return to start.

For the Y axis, the following program was utilized
(a) Block 000: move to position 2068 based on the encoder, rapid speed, provide complete signal to PLC.
(b) Block 001: move to position 2070 based on the encoder, feed rate equals 10000, send complete signal to PLC.
(c) Block 002: move to position 3.5 based on the LVDT, feed rate equals 50, send complete signal to PLC.
(d) Block 003: move to position 8.5 based on LVDT, feed back equals 50, go to next line.
(e) Block 004: move to 3.5 based on LVDT, feed rate equals 50, go to next line.
(f) Block 005: move to position 0 based on encoder, rapid speed, send complete signal to PLC.
(g) Block 006: return to start.

The following interaction and steps occur in the assembly 10 as illustrated in FIG. 5.

The central controller 86 initiates operation upon depression of a start button 90. The controller 86 then transmits enable and run commands to the positioning controllers 74, 76, to initiate the programs. Thereafter, an acknowledge signal is sent to the second positioning means 76 of the second transfer means 16. The second positioning means 76 operates its first line of code which instructs the motor 48 in combination with the encoder 68 to move to a first predetermined coordinate at a high rate of speed. The feedback and operation of the motor 48 and controller 76 is standard servo motor operation. After the move has been completed, the position controller 76 signals the central controller 86 that it has preformed the move by a complete signal. The central controller 86 then transmits an acknowledge signal to the first transfer means 14 and to the first position controller 74. A similar operation occurs along the axis Y moving the carrier member 24 to a coordinate position based on the motor and encoder combination. Once this move has been completed, the position controller 74 transmits a complete signal to the central controller 86. During this time that the first transfer means 14 is operating, the second transfer means 16 is in standby mode holding its position using the motor encoder feedback. Thereafter, the central controller 86 initiates both position controllers 74, 76 by transmitting a complete signal and switches to using the LVDT 66, 68 as feedback, effectively ignoring the motor encoders. Once the movement according to the program steps has occurred, both positioning means 74, 76 will transmit complete signals to the controller 86. Thereafter, the workarm 12 is moved back to its original position by allowing the controller 86 to switch to the first transfer means 14 and then the second transfer means 16 to retract both to their original position utilizing the encoder for positioning.

It is to be understood that the assembly 10 may operate in a single axis based on the teaching of the invention, or may operate in more than two axes by the addition of transfer means.

As an alternative embodiment, the LVDTs 66', 68' may be positioned on the stationary object 95 which will be acted on by the assembly 10 to provide positioning feedback signals. For example, the workarm 12 may carry a component to be accurately placed in an engine block as the stationary object 95. The LVDTs 66, 68 may be either attached to the work arm 12 for engagement with the stationary object 95, or the LVDTs 66', 68' may be located on the stationary object 95 for engagement against the workarm 12.

Additionally, a locating station 98' may be utilized to provide offset information regarding the object 95 to be worked on. The locating station 98' includes a pair of locating sensors 66", 68", i.e., LVDTs, for providing positional information regarding the exact position of the object. When the object 95 is moved into position, the sensors are engaged and provide a signal of the actual position thereof. The controllers 74, 76, 86 may then determine an offset from a predetermined position and add or subtract the offset from the distances programmed.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A positioning transfer assembly for positioning a workarm (12), said assembly comprising:

a workarm (12);.

first transfer means (14) supporting said workarm for moving the workarm along a first axis (Y), second transfer means (16) connected to and supporting said first transfer means (14) for effectively positioning said workarm along a second axis (X);

coarse sensor means (68, 68) connected to said first transfer means and said second transfer means and having a coarse resolution for sensing the position of said first and second transfer means (14, 16) and thus said workarm (12), fine sensor means (66, 68) attached to said workarm (12) having a fine resolution of resolution higher than said coarse resolution for sensing the variable position of said workarm (12) along said first axis (Y) and said second axis (X) to any one of several positions, said fine sensor means (66, 68) including at least two linear sensors (66, 68), control means (60) connected to said first and second transfer means (14, 16) and said fine and coarse sensor means (62–68) for controlling independently said first and second transfer means (14, 16) to a first coordinate position at a predetermined high speed based on feedback from said coarse sensor means (66, 68) and for controlling said first and second transfer means (14, 16) to a second coordinate position at predetermined low speeds based on feedback from said fine sensor means (66, 68), said control means controlling said first transfer means (14) based on one of said linear sensors (66, 68) and controlling said second transfer means (16) based on the other of said linear sensors (66, 68).

2. An assembly as set forth in claim 1 wherein said two linear sensors (66, 68) are comprised of linear variable differential transducers (LVDT).

3. An assembly as set forth in claim 1 further including mounting means (90) connected between said workarm (12) and said linear sensors for mounting said two linear sensors (66, 68) in a common plane positioned so that centerlines through said sensors (66, 68) intersect producing a locating point.

4. An assembly as set forth in claim 3 wherein said control means (60) includes first and second positioning means (74, 76) for receiving the sensed positions from said coarse and fine sensor means (62–68) and for controlling said first and second transfer means (14, 16) utilizing feedback from said coarse sensor means (62, 68) to position said transfer means to said first coordinate position and utilizing feedback from said fine sensor means (66, 68) to position said transfer means to said second coordinate position.

5. An assembly as set forth in claim 3 wherein said control means (60) includes a central controller (86) for switching control between said first and second positioning means (74, 76) to control movement along either axis or both simultaneously.

6. An assembly as set forth in claim 1 wherein each of said transfer means include a threaded shaft (20, 22) with a carrier member (24, 26) operatively engaged therewith for linearly moving in response to rotation of said threaded shaft (20, 22), and drive means (28, 30) connected to said threaded shaft (20, 22) for driving rotation of said threaded shaft (20, 22).

7. An assembly as set forth in claim 6 wherein said course sensor means (62, 68) comprises an encoder operatively connected to said drive means (28, 30) for detecting the position of said carrier member (24, 26) linearly along said shaft (20, 22).

8. An assembly as set forth in claim 7 wherein said carrier member (24) of said first transfer means (14) includes said workarm (12) and said fine sensor means (66, 68) is connected to said workarm (12).

9. An assembly as set forth in claim 8 wherein said two linear sensors are connected to said workarm (12) in a single plane with centerlines longitudinally extending along said linear sensors with said sensors positioned so that the centerlines intersect for sensing the position along each of said axes (X, Y).

10. An assembly as set forth in claim 9 wherein each said drive means and it's encoder comprise a servo motor operatively connected to it's respective threaded shaft (20, 22).

11. An assembly as set forth in claim 1 wherein said control means (60) includes first positioning means (74) for receiving the sensed positions from the coarse and fine sensor means and for controlling said first transfer means (14) utilizing feedback from said course sensor means to position said first transfer means to said first coordinate position and utilizing feedback from said fine sensor means to position said first transfer means to said second coordinate position.

12. An assembly as set forth in claim 11 wherein said control means (60) includes a central controller (86) for switching control selectively to and communicating with said first positioning means (74) to control movement along said first axis.

13. An assembly as set forth in claim 12 wherein said first transfer means includes a linear shaft with a carrier member operatively engaged therewith for linearly moving along said shaft, and drive means (28) connected with said shaft and said carrier member for driving and moving said carrier member along said shaft.

14. An assembly as set forth in claim 13 wherein said coarse sensor means comprises an encoder for detecting the position of said carrier member linearly along said shaft.

15. An assembly as set forth in claim 13 wherein said linear shaft comprises a threaded shaft with said carrier member engaged within the threads thereof for linearly moving in response to rotation of said threaded shaft, and said drive means connected to said threaded shaft for drawing rotation of said shaft.

16. An assembly as set forth in claim 15 wherein said drive means and said encoder comprise a servo motor operatively connected to the threaded shaft.

17. A positioning transfer assembly for positioning a workarm (12), said assembly comprising:

a workarm (12);

a first transfer assembly (14) for connection to the workarm (12) to move said workarm along a first axis (Y), a second transfer assembly (16) connected to said first transfer assembly (14) for effectively positioning said workarm along a second axis (X)

a coarse sensor (62, 64) connected to said first transfer assembly (14) and said second transfer assembly (16) and having a coarse resolution for sensing the position of said first transfer assembly (14) and said second transfer assembly (16) and thus said workarm (12), at least two linear fine sensors (66, 68) attached to said workarm (12) and having a fine resolution higher than said coarse resolution for sensing the variable position of said workarm (12) along said first axis (Y) and said second axis (X) to any one of several positions, a controller (60) connected to said first and second transfer assemblies (14, 16) and said fine and coarse sensors (62–68) for controlling said first transfer assembly (14) to a first coordinate position at a predetermined high speed based on feedback from the coarse sensor (62, 68) and for controlling said first transfer assembly (14) to a second coordinate position at predetermined low speeds based on feedback from the fine sensors (66, 68) and for controlling said second transfer assembly (16) to a third coordinate position at a predetermined high speed based on feedback from the coarse sensor (62, 68) and for controlling said second transfer assembly (16) to a fourth coordinate position at predetermined low speeds based on feedback from the fine sensors (66, 68).

* * * * *